(12) United States Patent
Suh et al.

(10) Patent No.: US 9,110,347 B2
(45) Date of Patent: Aug. 18, 2015

(54) METHOD OF FABRICATING DISPLAY APPARATUS AND DISPLAY APPARATUS FABRICATED THEREBY

(71) Applicant: Electronics and Telecommunications Research Institute, Daejeon (KR)

(72) Inventors: Kyung Soo Suh, Daejeon (KR); Seung Youl Kang, Daejeon (KR); Joo Yeon Kim, Daejeon (KR); Seongdeok Ahn, Daejeon (KR); Hojun Ryu, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/031,304

(22) Filed: Sep. 19, 2013

(65) Prior Publication Data

US 2014/0104676 A1 Apr. 17, 2014

(30) Foreign Application Priority Data

Oct. 12, 2012 (KR) .................. 10-2012-0113372
Oct. 15, 2012 (KR) .................. 10-2012-0114264
Apr. 4, 2013 (KR) .................. 10-2013-0036894

(51) Int. Cl.
*G02B 26/00* (2006.01)
*G02F 1/167* (2006.01)
*G02F 1/1341* (2006.01)

(52) U.S. Cl.
CPC ............. *G02F 1/167* (2013.01); *G02F 1/1341* (2013.01); *G02F 2001/1672* (2013.01); *Y10T 29/49155* (2015.01)

(58) Field of Classification Search
CPC ............................. G02F 1/1341; G02F 1/167

USPC ......... 359/296, 900; 345/107; 430/32, 34, 38; 204/600, 450
See application file for complete search history.

(56) References Cited

U.S. PATENT DOCUMENTS

| 6,262,706 | B1 | 7/2001 | Albert et al. |
| 7,167,155 | B1 | 1/2007 | Albert et al. |
| 2009/0180172 | A1* | 7/2009 | Murakami ............... 359/296 |
| 2012/0008188 | A1 | 1/2012 | Telfer et al. |
| 2012/0134009 | A1 | 5/2012 | Paolini, Jr. et al. |
| 2014/0104674 | A1* | 4/2014 | Ting et al. ............... 359/296 |

FOREIGN PATENT DOCUMENTS

| KR | 10-0793228 B1 | 1/2008 |
| KR | 10-2010-0059258 A | 6/2010 |

OTHER PUBLICATIONS

Barrett Comiskey et al., "An electrophoretic ink for all-printed reflective electronic displays", Nature, Jul. 16, 1998, pp. 253-255, vol. 394.
Keun Soo Kim et al., "Large-scale pattern growth of grapheme films for stretchable transparent electrodes", Nature, Feb. 5, 2009, pp. 706-710, vol. 457.

* cited by examiner

*Primary Examiner* — Tuyen Tra
(74) *Attorney, Agent, or Firm* — Rabin & Berdo, P.C.

(57) ABSTRACT

A method of fabricating a display apparatus includes forming a lower electrode on a lower substrate, forming a partition structure and an ink-injection tube connected to one end of the partition structure, the partition structure including first partitions, and second partitions, and cell regions defined by the first and second partitions, covering the partition structure with an upper electrode, and injecting an electronic ink through the ink-injection tube to fill the cell regions of the partition structure.

17 Claims, 13 Drawing Sheets

Second Direction ↑
First Direction →

METHOD OF FABRICATING DISPLAY APPARATUS AND DISPLAY APPARATUS FABRICATED THEREBY

CROSS-REFERENCE TO RELATED APPLICATIONS

This U.S. non-provisional patent application claims priority under 35 U.S.C. §119 to Korean Patent Application Nos. 10-2012-0113372, 10-2012-0114264, and 10-2013-0036894, filed on Oct. 12, 2012, Oct. 15, 2012, and Apr. 4, 2013, the entirety of which is incorporated by reference herein.

BACKGROUND

The inventive concept relates to a method of fabricating a display apparatus and the display apparatus fabricated thereby and, more particularly, to a method of fabricating a display apparatus including an electronic paper and the display apparatus fabricated thereby.

Electronic papers (e-papers) are used in electronic books and/or display apparatuses. Particularly, e-papers using electrophoresis are being used commonly. The electrophoretic e-papers may be driven using capsules having suspension including particles dispersed in a fluid. Additionally, the electrophoretic e-papers may be driven by directly injecting ink into cells thereof. Since the electrophoretic e-papers are a reflective type, their readability is high. Additionally, since the electrophoretic e-papers have bistability, their power consumption may be sharply lower than those of a conventional liquid crystal display (LCD) or a conventional organic light emitting diode (OLED). Thus, the electrophoretic e-papers have been used commonly in advance and may be applied to price-displaying boards and billboards.

Electrophoretic e-papers that are currently used commonly may display an image in black and white, so that their applications may be limited. Thus, e-papers capable of displaying colors should be developed. Recently, color filters have been used or color particles have been directly injected into cells, thereby realizing color e-papers. However, if the color filter is installed in the e-paper, the e-paper may be difficult to have high color gamut and high reflexibility. Additionally, if the color particles are injected into the cells of the e-paper, the color particles may be difficult to be injected into a desired position and/or a capsule including the color particles may be difficult to be patterned.

SUMMARY

Embodiments of the inventive concept may provide a method of fabricating a display apparatus capable of improving reliability.

Embodiments of the inventive concept may also provide a display apparatus capable of improving reliability.

In one aspect, a method of fabricating a display apparatus may include: forming a lower electrode on a lower substrate; forming a partition structure and an ink-injection tube connected to one end of the partition structure on the lower electrode, the partition structure including first partitions constituting rows parallel to a first direction, second partitions constituting columns parallel to a second direction, and cell regions defined by the first and second partitions, each of the first partitions including an opening, and the columns of the second partitions crossing the rows of the first partitions; covering the partition structure with an upper electrode; and injecting an electronic ink through the ink-injection tube to fill the cell regions of the partition structure.

In some embodiments, the ink-injection tube may extend from the first partition.

In some embodiments, covering the partition structure with the upper electrode may include: forming the upper electrode on an upper substrate; forming an adhesive on the upper electrode; and bonding the partition structure to the adhesive.

In some embodiments, after injecting the electronic ink, the method may further include: remove the ink-injection tube from the partition structure by a cutting process; and forming an insulating material at a cut portion of the partition structure to prevent the electronic ink from escaping from the partition structure.

In some embodiments, the partition structure may be formed to have a honeycomb structure including hexagonal shapes, a strip type structure, or a network structure including quadrilateral shapes.

In some embodiments, the ink-injection tube may include a plurality of ink-injection tubes; and the plurality of ink-injection tubes may be symmetrical.

In some embodiments, the cell regions may include: first cell regions arranged in the second direction to constitute a first cell region group; second cell regions arranged in the second direction to constitute a second cell region group; and third cell regions arranged in the second direction to constitute a third cell region group. The first, second, and third cell region groups may be alternately and repeatedly arranged in the first direction.

In some embodiments, the method may further include: forming an ink-exhaust tube extending from the first partition of another end of the partition structure. The ink-exhaust tube may be formed when the ink-injection tube is formed.

In some embodiments, the ink-injection tube may include a first tube and second tubes and the ink-exhaust tube includes a third tube and fourth tubes. The number of the ink-injection tube may be equal to the number of a color of the electronic ink filling the cell region groups, and the number of the ink-exhaust tube may be also equal to the number of the color of the electronic ink filling the cell region groups. Each of the second tubes and each of the fourth tubes may be connected to one end and another end of each of the cell region groups, respectively. The first tube may be connected to the second tubes of the cell region groups filled with the electronic inks having the same color, and the third tube may be connected to the fourth tubes of the cell region groups exhausting the electronic inks having the same color.

In some embodiments, before injecting the electronic ink, the method may further include: preparing a pump and an ink-exhaust connection tube connected to the pump; and connecting the ink-exhaust connection tube to the ink-exhaust tube.

In some embodiments, the ink-injection tube may include a plurality of ink-injection tubes connected to the first to third cell region groups, respectively. In this case, injecting the electronic ink may include: injecting the electronic inks having different colors from each other into the first to third cell region groups, respectively.

In some embodiments, before forming the partition structure, the method may further include: forming thin film transistors in the cell regions on the lower substrate, respectively. A drain electrode of each of the thin film transistors may extend onto the lower substrate, and the drain electrode of the thin film transistor may be the lower electrode.

In some embodiments, the partition structure and the ink-injection tube may be formed of a photoresist material.

In some embodiments, the electronic ink may be formed of a material of which a color is electrically changed. The material of the electronic ink may include a dielectric fluid including a dye, a dielectric fluid including a pigment, a dielectric fluid including a dye and a pigment, a dielectric fluid including two or more colored particles, a color-changeable fluid, or a photonic crystal colloid.

In some embodiments, the ink-injection tube may extend on one sidewall of the partition structure in the first direction.

In some embodiments, forming the ink-injection tube may include: forming a photoresist layer on the one sidewall of the partition structure; patterning the photoresist layer to form an ink-injection pattern extending from the first cell region group; and forming an ink-injection cover on the ink-injection pattern.

In some embodiments, the ink-injection tube may include a plurality of ink-injection tubes connected to the first to third cell region groups, respectively; and the ink-injection tubes may be arranged in a direction perpendicular to a top surface of the lower substrate.

In another aspect, a display apparatus may include: a lower electrode on a top surface of a lower substrate; a partition structure disposed on a top surface of the lower electrode, the partition structure including first partitions, second partitions, and cell regions defined by the first and second partitions; an upper electrode disposed on the partition structure, the upper electrode facing the lower electrode; and at least one electronic ink filling the cell regions. Each of the first partitions may have an opening. The first partitions may be arranged to constitute a plurality of rows parallel to a first direction, and the second partitions may be arranged to constitute a plurality of columns parallel to a section direction. The columns of the second partitions may cross the rows of the first partitions.

In some embodiments, the partition structure may have a honeycomb structure of hexagons, a strip type structure, or a network structure of quadrangles.

In some embodiments, the display apparatus may further include: an insulating material filling the opening of each of both ends of the partition structure.

BRIEF DESCRIPTION OF THE DRAWINGS

The inventive concept will become more apparent in view of the attached drawings and accompanying detailed description.

DETAILED DESCRIPTION OF THE EMBODIMENTS

Figure 1:
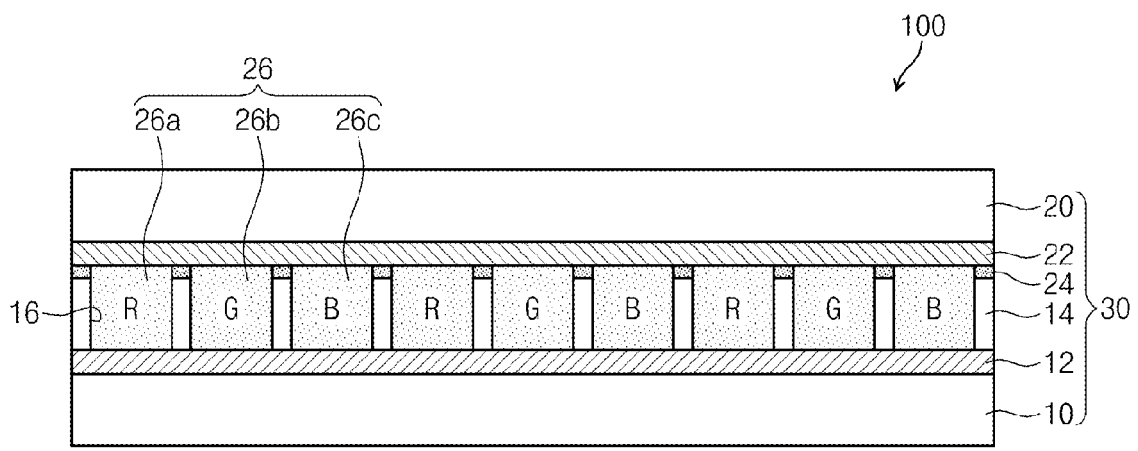
FIG. 1 is a cross-sectional view illustrating an electronic paper display apparatus according to some embodiments of the inventive concept.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

FIG. 1 is a cross-sectional view illustrating an electronic paper display apparatus according to some embodiments of the inventive concept.

Referring to FIG. 1, an electronic paper (e-paper) display apparatus 100 includes a lower electrode 12 formed on a top surface of a lower substrate 10, a partition structure 14 disposed on the lower electrode 12 to define cell regions 16, an upper substrate 20 including an upper electrode 22 opposite to the lower electrode 12, and electronic inks 26 filling the cell regions 16. The lower substrate 10, the lower electrode 12, the partition structure 14, the upper electrode 22, and the upper substrate 20 may constitute a display structure 30.

The lower and upper substrates 10 and 20 may be formed of a flexible material. For example, each of the lower and upper substrates 10 and 20 may be a semiconductor substrate, a glass substrate, a quartz substrate, a metal substrate, or a plastic substrate. If the lower and the upper substrates 10 and 20 are the metal substrates, insulating layers may be formed on the metal substrates.

For example, the lower and upper electrodes 12 and 22 may include a conductive polymer (e.g., polythiophene or polyaniline), metal particles (e.g., silver or nickel), a polymer film including the metal particles, indium-tin oxide (ITO), or indium-zinc oxide (IZO).

Figure 9:
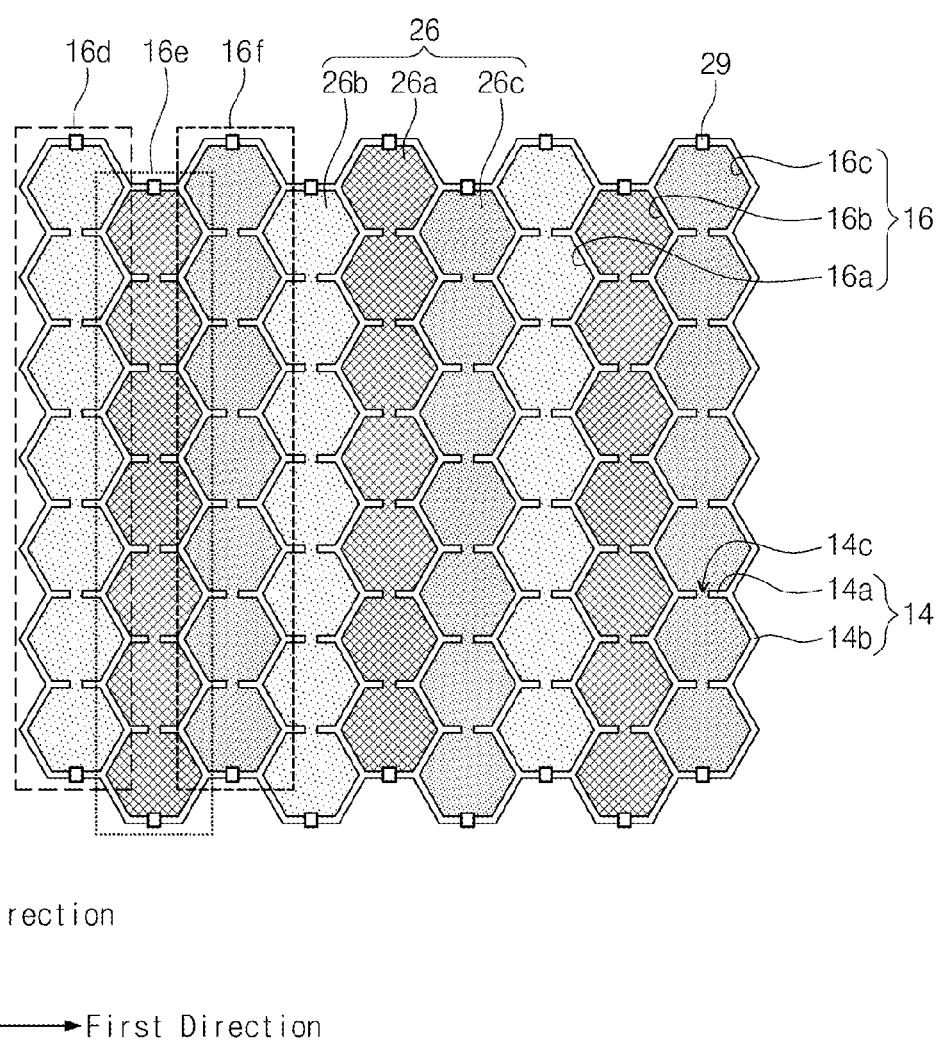
FIG. 9 is a plan view illustrating a partition structure separated from tubes in a method of fabricating a display apparatus according to some embodiments of the inventive concept.

Referring to FIGS. 1 and 9, the partition structure 14 may include first partitions 14a and second partitions 14b. The first partitions 14a may be arranged to constitute a plurality of rows parallel to a first direction in a plan view. Each of the first partitions 14a has an opening 14c. The second partitions 14b may be arranged to constitute a plurality of columns parallel to a second direction in a plan view. The columns of the second partitions 14b may cross the rows of the first partitions 14a. In other words, the second direction may cross the first direction. The second partitions 14b adjacent to each other in the first direction may be respectively formed at both sides of the openings 14c adjacent to each other in the second direction. In some embodiments, each of the first partitions 14a may extend in the first direction, and each of the second partitions 14b may extend in a zigzag form in the second direction. The partition structure 14 may have a honeycomb structure including hexagonal shapes in a plan view. However, the inventive concept is not limited to the hexagonal shapes of the partition structure 14. In other embodiments, the partition structure 14 may be formed in various forms such as a strip type form, or a network type form including quadrilateral shapes.

The cell regions 16 defined by the partition structure 14 may include first cell regions 16a, second cell regions 16b, and third cell regions 16c. The first cell regions 16a may be arranged in the second direction to constitute a first cell region group 16d. The second cell regions 16b may be arranged in the second direction to constitute a second cell region group 16e. The third cell regions 16c may be arranged in the second direction to constitute a third cell region group 16f. The first, second, and third cell region groups 16d, 16e, and 16f may be alternately and repeatedly arranged in the first direction. Thus, the first, second, and third cell regions 16a, 16b, and 16c adjacent to each other in the first direction may be divided by the second partitions 14b. The first cell regions 16a in the first cell region group 16d may be divided by the first partitions 14b. Likewise, the second cell regions 16b in the second cell region group 16e may also be divided by the first partitions 14b, and the third cell regions 16c in the third cell region group 16f may also be divided by the first partitions 14b. The first cell regions 16a in the first cell region group 16d may be connected to each other through the openings 14c of the first partitions 14a therebetween. Likewise, the second cell regions 16b in the second cell region group 16e may be connected to each other through the openings 14c of the first partitions 14a therebetween, and the third cell regions 16c in the third cell region group 16f may be connected to each other through the openings 14c of the first partitions 14a therebetween.

The cell regions 16 may be filled with electronic inks 26. For example, if the display apparatus 100 is driven using three colors, a red electronic ink 26a may fill the first cell region group 16d, a green electronic ink 26b may fill the second cell region group 16e, and a blue electronic ink 26c may fill the third cell region group 16f. Alternatively, if the display apparatus 100 is driven using one color, the electronic inks filling the first, second, and third cell region groups 16d, 16e, and 16f may have the same color. The electronic inks 26 may be formed of a material of which a color is electrically changed. For example, the electronic inks 26 may include a dielectric fluid including a dye, a dielectric fluid including a pigment, a dielectric fluid including a dye and a pigment, a dielectric fluid including two or more colored particles, a color-changeable fluid, or a photonic crystal colloid.

An insulating material 29 may be disposed in each of the openings 14c formed on one side and another side of the partition structure 14. The insulating material 29 may include a sealing material or a sealing film.

Figure 2:
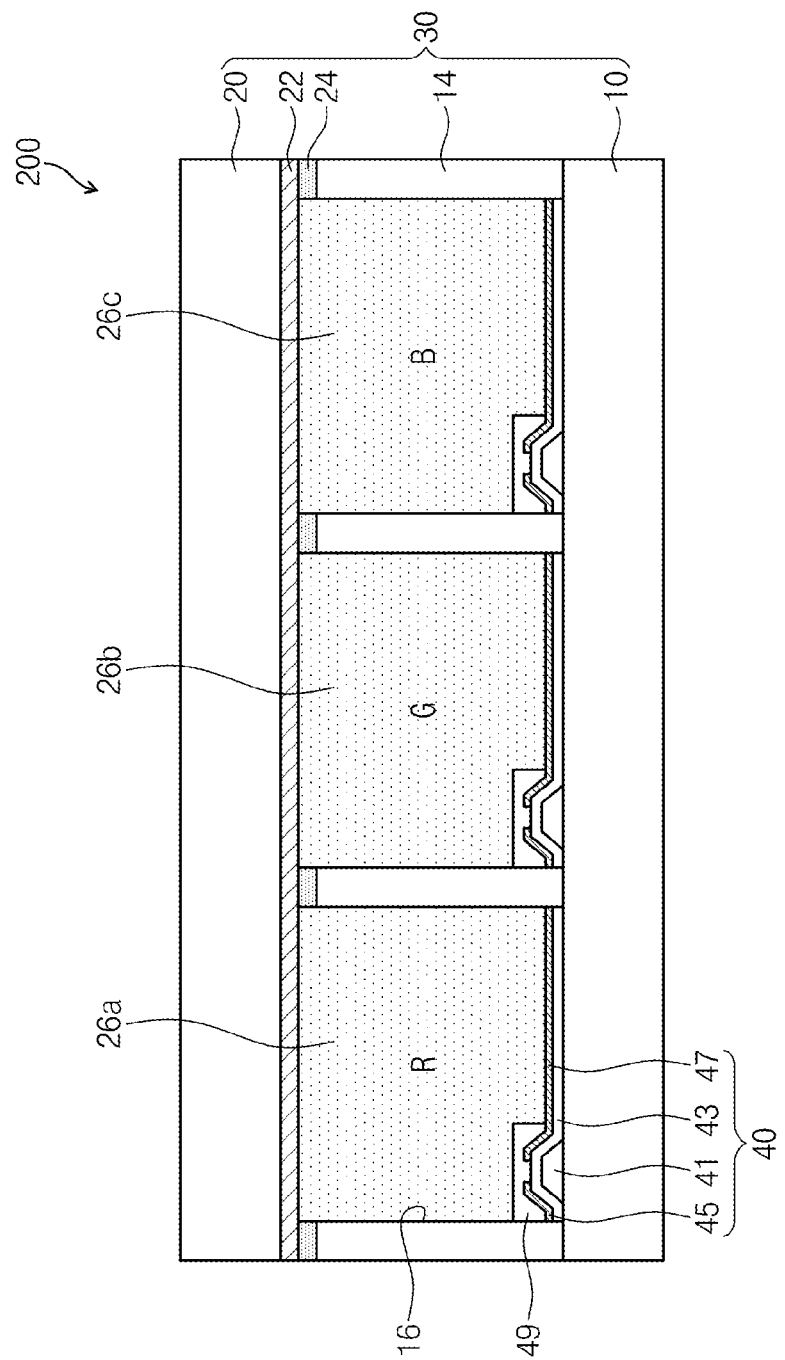
FIG. 2 is a cross-sectional view illustrating an electronic paper display apparatus according to other embodiments of the inventive concept.

FIG. 2 is a cross-sectional view illustrating an electronic paper display apparatus according to other embodiments of the inventive concept. In the present embodiment, the same elements as illustrated in the embodiment of FIG. 1 will be indicated by the same reference numerals or the same reference designators. For the purpose of ease and convenience in explanation, the descriptions to the same elements as in the embodiment of FIG. 1 will be omitted or mentioned briefly.

Referring to FIG. 2, thin film transistors 40 may be formed in the cell regions 16 on the lower substrate 10, respectively. Each of the thin film transistor 40 may include a gate electrode 41 covered by an insulating layer 43, a source electrode 45, and a drain electrode 47. The source and drain electrodes 45 and 47 may be spaced apart from each other and may be formed at both sides of the gate electrode 41, respectively.

The drain electrode 47 may extend onto the lower substrate 10. Thus, the drain electrode 47 may be used as the lower electrode 12 of a display apparatus 200. A capping layer 49 may be further provided to cover the source electrode 45 and a portion of a top surface of the drain electrode 47.

Figure 3:
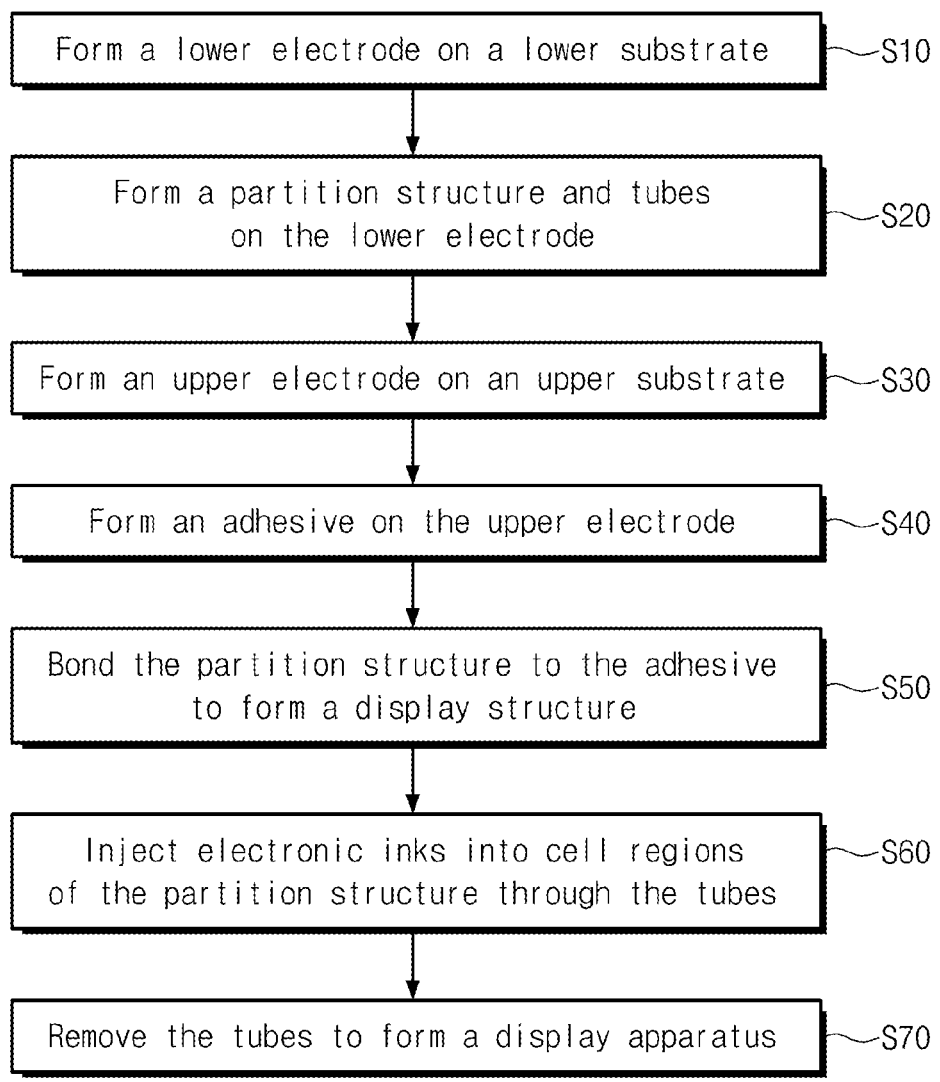
FIG. 3 is a flowchart illustrating a method of fabricating a display apparatus according to some embodiments of the inventive concept.
Figure 5:
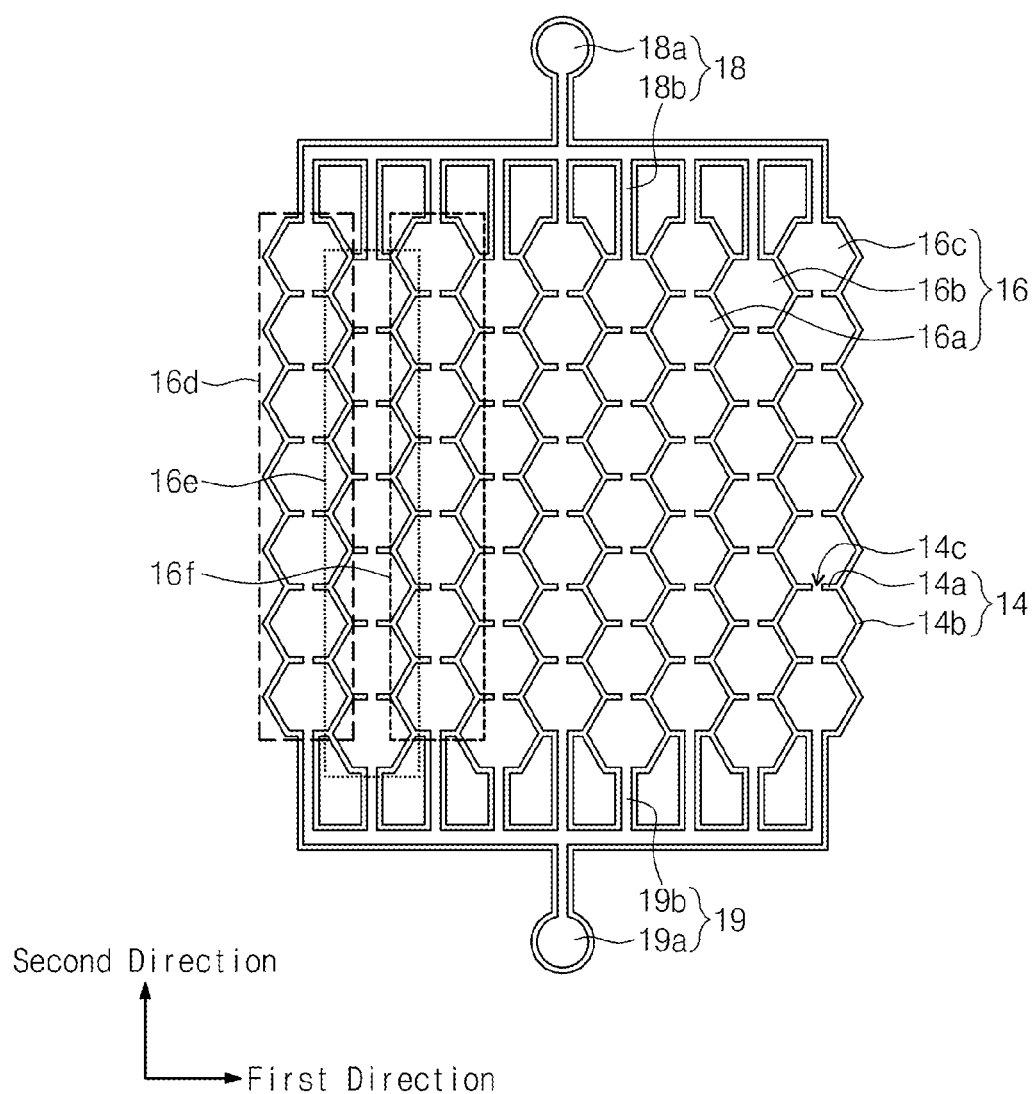
FIG. 5 is a plan view illustrating cell regions and tubes in a method of fabricating a display apparatus according to some embodiments of the inventive concept.
Figure 6:
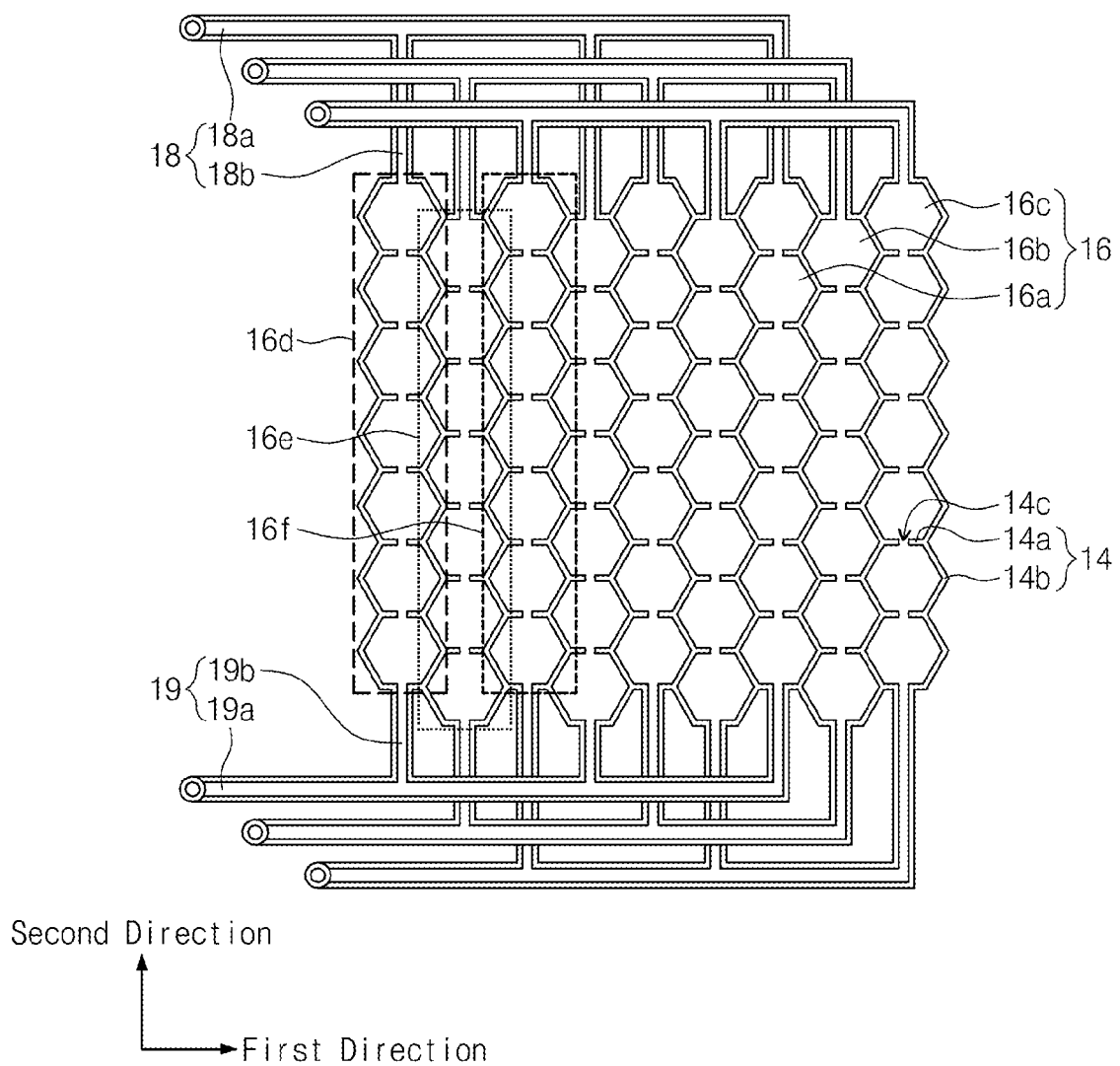
FIG. 6 is a plan view illustrating cell regions and tubes in a method of fabricating a display apparatus according to other embodiments of the inventive concept.
Figure 7:
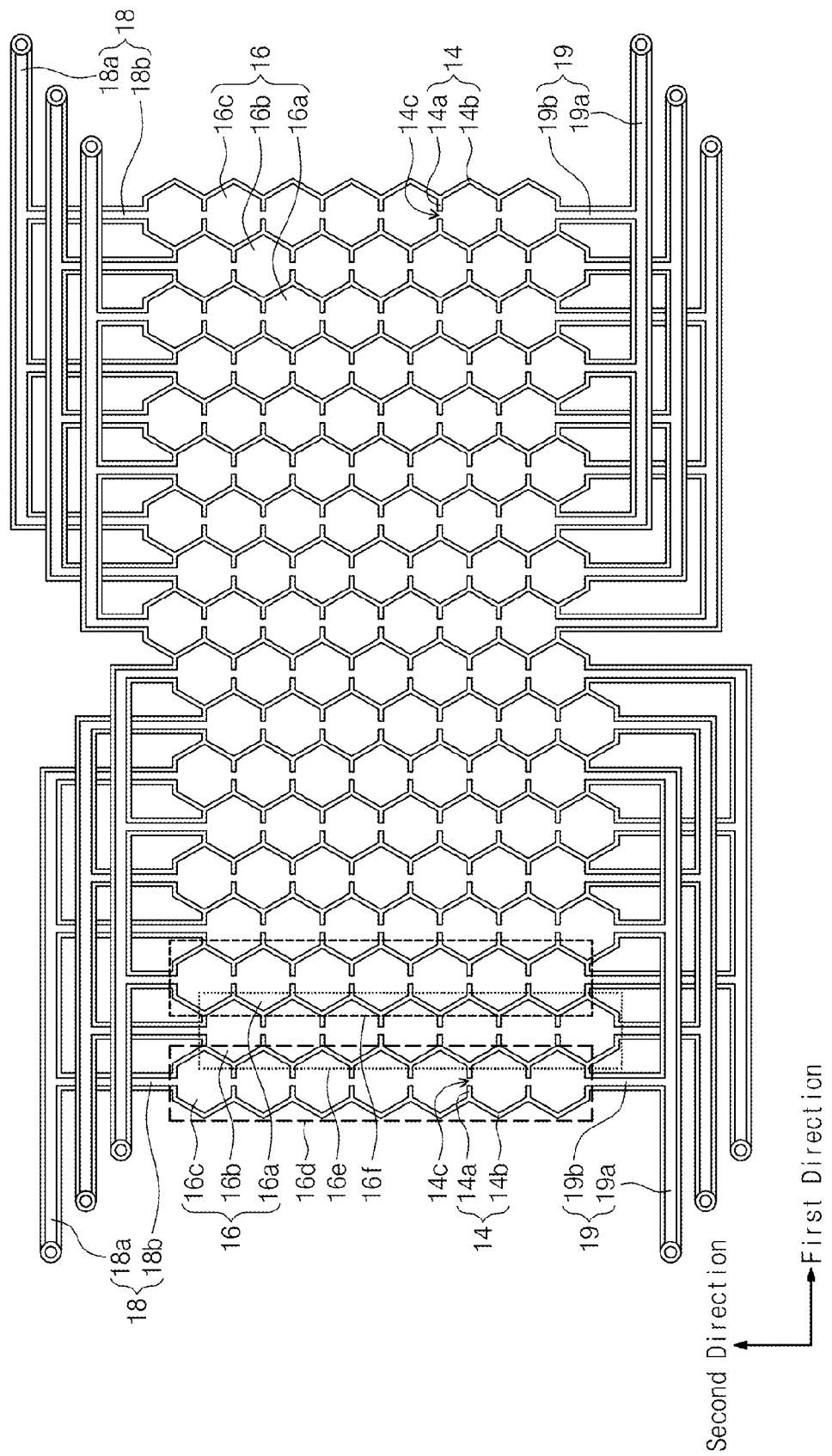
FIG. 7 is a plan view illustrating cell regions and tubes in a method of fabricating a display apparatus according to still other embodiments of the inventive concept.
Figure 8:
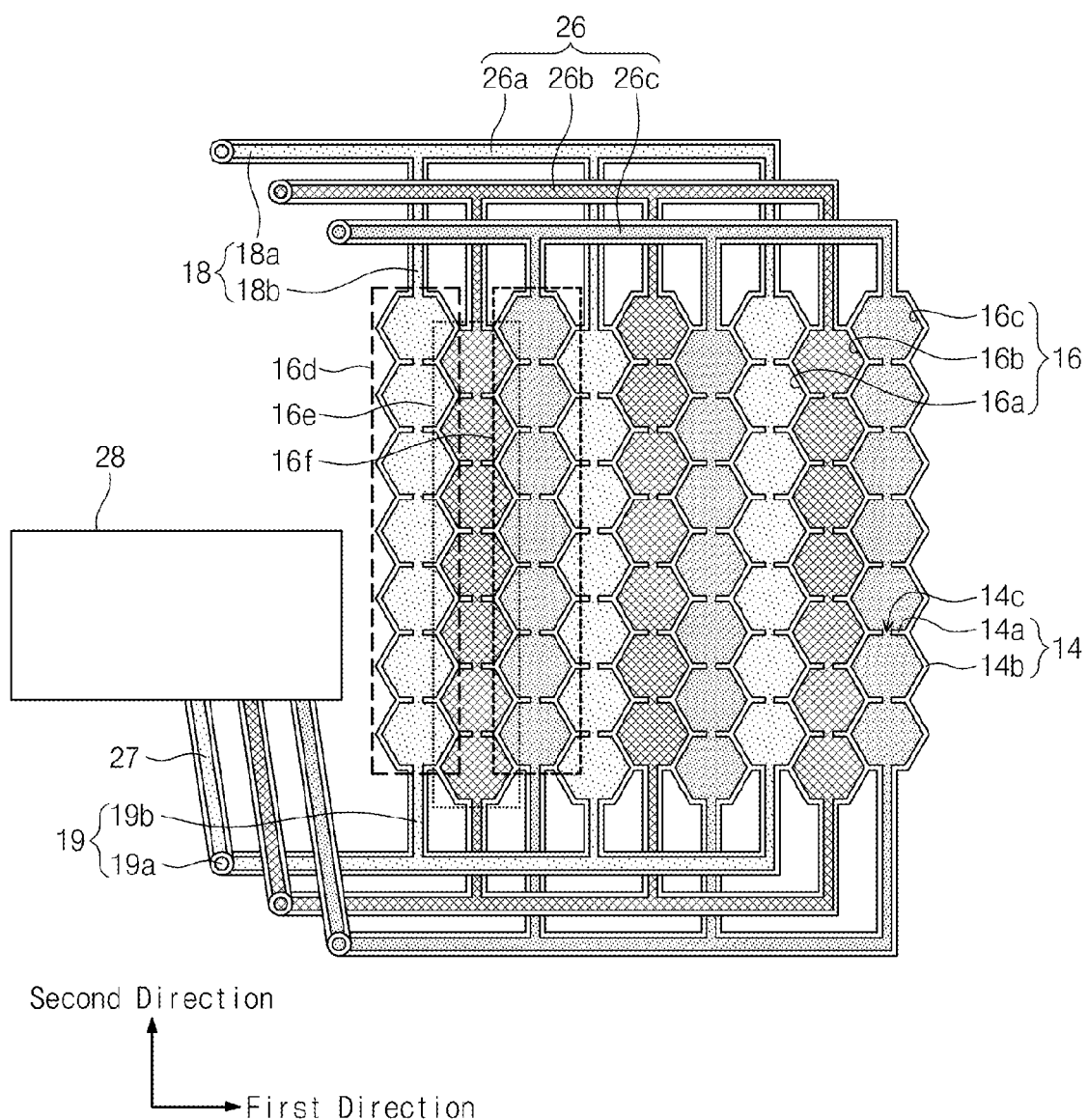
FIG. 8 is a plan view illustrating methods of injecting/exhausting electronic inks of three colors into/from cell regions by using tubes in a method of fabricating a display apparatus according to some embodiments of the inventive concept.

FIG. 3 is a flowchart illustrating a method of fabricating a display apparatus according to some embodiments of the inventive concept. FIGS. 4A to 4E are cross-sectional views illustrating a method of fabricating a display apparatus according to some embodiments of the inventive concept. FIG. 5 is a plan view illustrating cell regions and tubes in a method of fabricating a mono-color display apparatus according to some embodiments of the inventive concept. FIG. 6 is a plan view illustrating cell regions and tubes in a method of fabricating a multi-color display apparatus according to other embodiments of the inventive concept. FIG. 7 is a plan view illustrating cell regions and tubes in a method of fabricating a display apparatus according to still other embodiments of the inventive concept. FIG. 8 is a plan view illustrating methods of injecting/exhausting electronic inks of three colors into/from cell regions by using tubes in a method of fabricating a display apparatus according to some embodiments of the inventive concept. FIG. 9 is a plan view illustrating a partition structure separated from tubes in a method of fabricating a display apparatus according to some embodiments of the inventive concept.

Figure 4A:
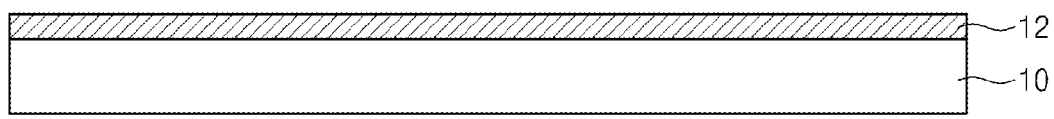
FIGS. 4A to 4E are cross-sectional views illustrating a method of fabricating a display apparatus according to some embodiments of the inventive concept.

Referring to FIGS. 3 and 4A, a lower electrode 12 is formed on a lower substrate 10 (S10). The lower substrate 10 may be formed of a flexible material. For example, the lower substrate 10 may be a semiconductor substrate, a glass substrate, a quartz substrate, a metal substrate, or a plastic substrate. If the lower substrate 10 is the metal substrate, an insulating layer may be additionally formed on the metal substrate.

For example, the lower electrode 12 may include a conductive polymer (e.g., polythiophene or polyaniline), metal particles (e.g., silver or nickel), a polymer film including the metal particles, indium-tin oxide (ITO), or indium-zinc oxide (IZO). The lower electrode 12 may be formed by a chemical vapor deposition (CVD) method or a physical vapor deposition (PVD) method. In other embodiments, the thin film transistors 40 may be formed on the lower substrate 10, as illustrated in FIG. 2. A drain electrode 47 of the thin film transistor may be formed to extend onto the lower substrate 10.

Figure 4B:
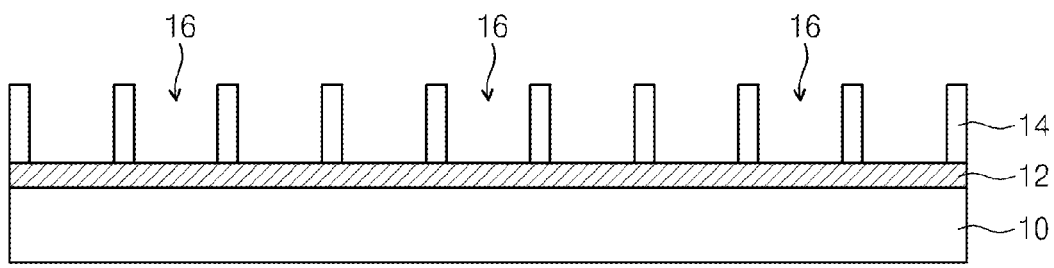

Referring to FIGS. 3 and 4B, a partition structure 14 is formed on the lower electrode 12 (S20). The partition structure 14 may be formed by any one of two methods. In a first method, a photoresist layer may be formed on the lower electrode 12 and then a lithography process may be performed on the photoresist layer to form the partition structure 14. At this time, a height and/or a thickness of the partition structure 14 may be controlled through a design of a photo mask. In a second method, a partition structure (not shown) manufactured in advance may be bonded to the lower electrode 12. The partition structure may be manufactured using a molding method or a printing method. An adhesion promoter may be used for increasing an adhesive strength between the lower electrode 12 and the partition structure.

Referring to FIGS. 5 to 7, the partition structure 14 may include first partitions 14a arranged to constitute a plurality of rows parallel to a first direction, and second partitions 14b arranged to constitute a plurality of columns parallel to a second direction in a plan view. The columns of the second partitions 14b may cross the rows of the first partitions 14a. Each of the first partitions 14a has an opening 14c. The partition structure 14 may have a honeycomb structure including hexagonal shapes in a plan view. However, the inventive concept is not limited to the hexagonal shapes of the partition structure 14. In other embodiments, the partition structure 14 may be formed in various forms such as a strip type form, or a network type form including quadrilateral shapes.

Spaces formed between the first and second partitions 14a and 14b of the partition structure 14 may be cell regions 16 for constituting sub-pixels. The cell regions 16 may include first cell regions 16a, second cell regions 16b, and third cell regions 16c. The first cell regions 16a may be arranged in the second direction to constitute a first cell region group 16d. Likewise, the second cell regions 16b may be arranged in the second direction to constitute a second cell region group 16e. The third cell regions 16c may be arranged in the second direction to constitute a third cell region group 16f. The first, second, and third cell region groups 16d, 16e, and 16f may be alternately and repeatedly arranged in the first direction. Thus, the first, second, and third cell regions 16a, 16b, and 16c adjacent to each other in the first direction may be divided by the second partitions 14b. The first cell regions 16a in the first cell region group 16d may be divided by the first partitions 14b. Likewise, the second cell regions 16b in the second cell region group 16e may also be divided by the first partitions 14b, and the third cell regions 16c in the third cell region group 16f may also be divided by the first partitions 14b. Thus, the first cell regions 16a in the first cell region group 16d may be connected to each other through the openings 14c of the first partitions 14a therebetween. Likewise, the second cell regions 16b in the second cell region group 16e may be connected to each other through the openings 14c of the first partitions 14a therebetween, and the third cell regions 16c in the third cell region group 16f may be connected to each other through the openings 14c of the first partitions 14a therebetween.

Tubes 18 and 19 may be formed simultaneously with the partition structure 14. The tubes 18 and 19 may be used in order to inject electronic inks into the cell region groups 16d, 16e, and 16f. The tubes 18 and 19 may include an ink-injection tube 18 and an ink-exhaust tube 19. The ink-injection tube 18 may include at least one first tube 18a and second tubes 18b. The ink-exhaust tube 19 may include at least one third tube 19a and fourth tubes 19b. The ink-injection tube 18 may extend to the first partitions 14a of first ends of the cell region groups 16d, 16e, and 16f, and the ink-exhaust tube 19 may extend to the first partitions 14a of second ends of the cell region groups 16d, 16e, and 16f. Thus, the ink-injection tube 18 and the ink-exhaust tube 19 may be connected to the cell region groups 16d, 16e, and 16f. The tubes 18 and 19 may be formed of the same material as the partition structure 14.

In some embodiments, the number of the first tubes 18a and the number of the third tubes 19a may be equal to the number of the colors of the electronic inks injected into the cell region groups 16d, 16e, and 16f, as illustrated in FIG. 5. The second tubes 18b may extend from the first tubes 18a to the first ends of the cell region groups 16d, 16e, and 16f. The fourth tubes 19b may extend from the third tubes 19a to the second ends of the cell region groups 16d, 16e, and 16f.

Referring to FIG. 5, if one color electronic ink is provided into the cell region groups 16d, 16e, and 16f, one first tube 18a and one third tube 19a may be provided to the partition structure 14. In this case, the second tubes 18b may extend from the first tube 18a to the first, second, and third cell groups 16d, 16e, and 16f, respectively. The fourth tubes 19b may extend from the third tube 19a to the first, second, and third cell groups 16d, 16e, and 16f. In other words, the number of the second tubes 18b and the number of the fourth tubes 19b may be equal to the number of the first, second, and third cell groups 16d, 16e, and 16f.

Referring to FIG. 6, if the electronic inks having three colors (e.g., a red color, a green color, and a blue color) fill the first, second, and third groups 16d, 16e, and 16f, respectively, three ink-injection tubes 18 and three ink-exhaust tubes 19 may be provided to the partition structure 14. One of the three ink-injection tubes 18 may be connected to the first cell region groups 16d, another of the three ink-injection tubes 18 may be connected to the second cell region groups 16e, and the other of the three ink-injection tubes 18 may be connected to the third cell region groups 16f. Likewise, one of the three ink-exhaust tubes 19 may be connected to the first cell region groups 16d, another of the three ink-exhaust tubes 19 may be connected to the second cell region groups 16e, and the other of the three ink-exhaust tubes 19 may be connected to the third cell region groups 16f. The red color electronic ink, the green color electronic ink, and the blue color electronic ink may be injected into the first tubes 18a of the three ink-injection tubes 18, respectively. The red color electronic ink, the green color electronic ink, and the blue color electronic ink may be exhausted through the third tubes 19a of the three ink-exhaust tubes 19, respectively. For example, the first, second, and third cell region groups 16d, 16e, and 16f may be filled with the red color electronic ink, the green color electronic ink, and the blue color electronic ink, respectively. The second tubes 18b of the ink-injection tube 18 connected to the first cell region groups 16d may be connected from its the first tube 18a to the first ends of the first cell region groups 16d, respectively. Likewise, the second tubes 18b of the ink-injection tube 18 connected to the second cell region groups 16e may be connected from its the first tube 18a to the first ends of the second cell region groups 16e, respectively, and the second tubes 18b of the ink-injection tube 18 connected to the third cell region groups 16f may be connected from its the first tube 18a to the first ends of the third cell region groups 16f, respectively. The fourth tubes 19b of the ink-exhaust tube 19 connected to the first cell region groups 16d may be connected from its third tube 19a to the second ends of the first cell region groups 16d, respectively. Likewise, the fourth tubes 19b of the ink-exhaust tube 19 connected its third tube 19a to the second cell region groups 16e may be connected to the second ends of the second cell region groups 16e, respectively, and the fourth tubes 19b of the ink-exhaust tube 19 connected to the third cell region groups 16f may be connected its third tube 19a to the second ends of the third cell region groups 16f, respectively.

In still other embodiments, if the cell region groups 16d, 16e, and 16f are alternately and repeatedly disposed in a large area as illustrated in FIG. 7, the ink-injection tubes 18 may be disposed to be symmetrical, and the ink-exhaust tubes 19 may also be disposed to be symmetrical. For example, if the number of the cell region groups 16d, 16e, and 16f are 18 and the first, second, and third cell region groups 16d, 16e, and 16f are filled with the three color electronic inks, respectively, six ink-injection tubes 18 and six ink-exhaust tubes 19 may be formed. In this case, three ink-injection tubes 18 and three ink-exhaust tubes 19 may be connected to first ends and second ends of nine cell region groups 16d, 16e, and 16f. The next three ink-injection tubes 18 and the next ink-exhaust tubes 19 may be connected to first ends and second ends of the next cell region groups 16d, 16e, and 16f.

Figure 4C:
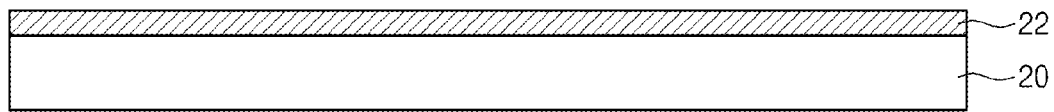

Referring to FIGS. 3 and 4C, an upper electrode 22 is formed on an upper substrate 20 (S30). The upper substrate 20 may be formed of a light transmitting material having reflexibility. For example, the upper substrate 20 may be a semiconductor substrate, a glass substrate, a quartz substrate, a metal substrate, or a plastic substrate. For example, the upper electrode 22 may include a conductive polymer (e.g., polythiophene or polyaniline), metal particles (e.g., silver or nickel), a polymer film including the metal particles, indium-tin oxide (ITO), or indium-zinc oxide (IZO).

Figure 4D:
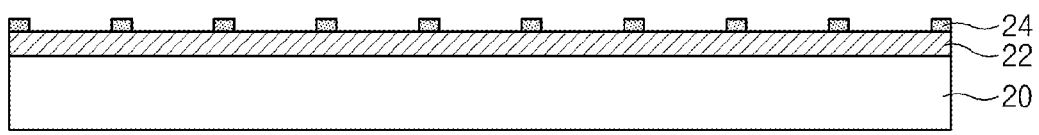

Referring to FIGS. 3 and 4D, an adhesive 24 is formed on the upper electrode 22 (S40). The adhesive 24 may be formed on the upper electrode 22 by a patterning process. The adhesive 24 may be formed of a material not reacting with the electronic inks provided in a subsequent process.

Figure 4E:
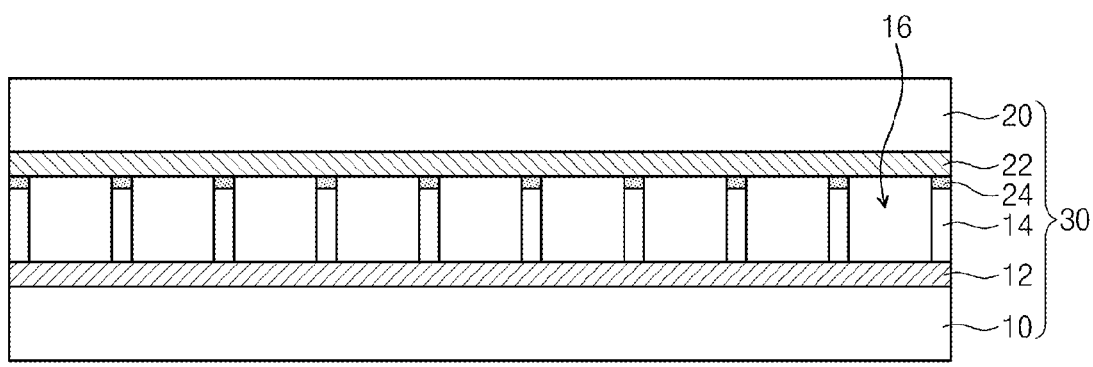

Referring to FIGS. 3 and 4E, the partition structure 14 is bonded to the adhesive 24 to form a display structure 30 (S50). After the partition structure 14 is bonded to the adhesive 24, the adhesive 24 may be hardened to complete the display structure 30.

Referring again to FIGS. 1, 3, and 8, the electronic inks 26 are injected into the cell regions 16a, 16b, and 16c (S60). The electronic inks 26 may be formed of a material of which a color is electrically changed. For example, the electronic inks 26 may include a dielectric fluid including a dye, a dielectric fluid including a pigment, a dielectric fluid including a dye and a pigment, a dielectric fluid including two or more colored particles, a color-changeable fluid, or a photonic crystal colloid. The electronic ink 26 may be provided into the first tube 18a and then may flow through the second tubes 18b. Thus, the electronic inks 26 may be injected to the first, second, and third cell region groups 16d, 16e, and 16f connected to the second tubes 18b.

The red color electronic ink 26a, the green color electronic ink 26b, and the blue color electronic ink 26c may be injected into three ink-injection tubes 18, respectively. The red color electronic ink 26a may fill the first cell region groups 16d, the green color electronic ink 26b may fill the second cell region groups 16e, and the blue color electronic ink 26c may fill the third cell region groups 16f. After the first to third cell region groups 16d, 16e, and 16f are filled with the electronic inks 26a, 26b, and 26c, the rest portions of the electronic inks 26a, 26b, and 26c may be exhausted through the ink-exhaust tubes 19. The third tubes 19a may be connected to a pump 28 through ink-exhaust connection tubes 27. The pump 28 may be provide for easily injecting and exhausting the electronic inks 26a, 26b, and 26c. A flow rate control system for controlling a pumping amount of the pump 28 may be disposed between the ink-exhaust connection tubes 27 and the third tube 19a. The pump 28 may be a peristaltic pump or a vacuum pump.

Referring to FIGS. 1, 3, and 9, the tubes 18 and 19 are removed to form a display apparatus 100 (S70). When the injection of the electronic inks 26a, 26b, and 26c into the cell regions 16 is finished, the ink-injection tubes 18 and the ink-exhaust tubes 19 may be cut. In particular, the second tubes 18b and the fourth tubes 19b may be cut. After the second and fourth tubes 18b and 19b are cut, cut portions of the second and fourth tubes 18b and 19b may be blocked with an insulating material 29 in order to prevent the electronic inks 26a, 26b, and 26c from escaping from the first to third cell regions 16a, 16b, and 16c. The insulating material 29 may include a sealing material or a sealing film.

The electronic inks 26 are injected into the cell regions 16 after the formation of the display structure 30. The electronic inks 26 may completely fill the cell regions 16 through the ink-injection tubes 18 connected to the cell regions 16. Thus, the electronic inks 26 may be in contact with the lower and upper electrodes 12 and 22. As a result, properties (e.g., reflexibility, a contrast ratio, a response speed, a driving voltage) of the electronic inks 26 may be maximally exhibited to improve reliability of the display apparatus 100. Additionally, when the color electronic inks 26a, 26b, and 26c are injected into the cell regions 16, the color electronic inks 26a, 26b, and 26c may be selectively injected using the ink-injection tubes 18 into desired cell regions 16. Thus, the fabricating processes of the display apparatus 100 may be simplified.

Figure 10A:
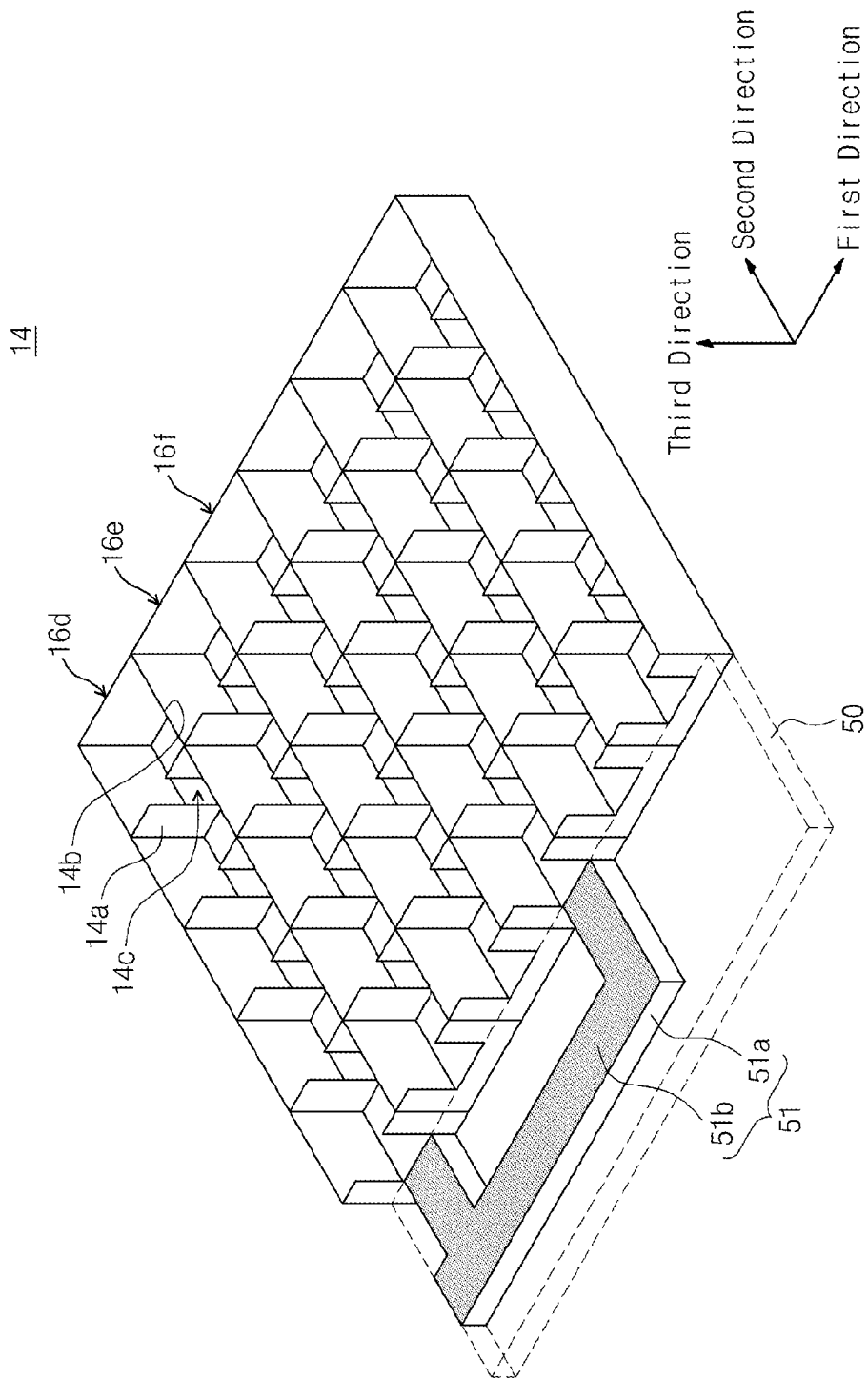
FIGS. 10A to 10C are perspective views illustrating a method of forming ink-injection tubes to a partition structure in a method of fabricating a display apparatus according to other embodiments of the inventive concept.
Figure 10B:
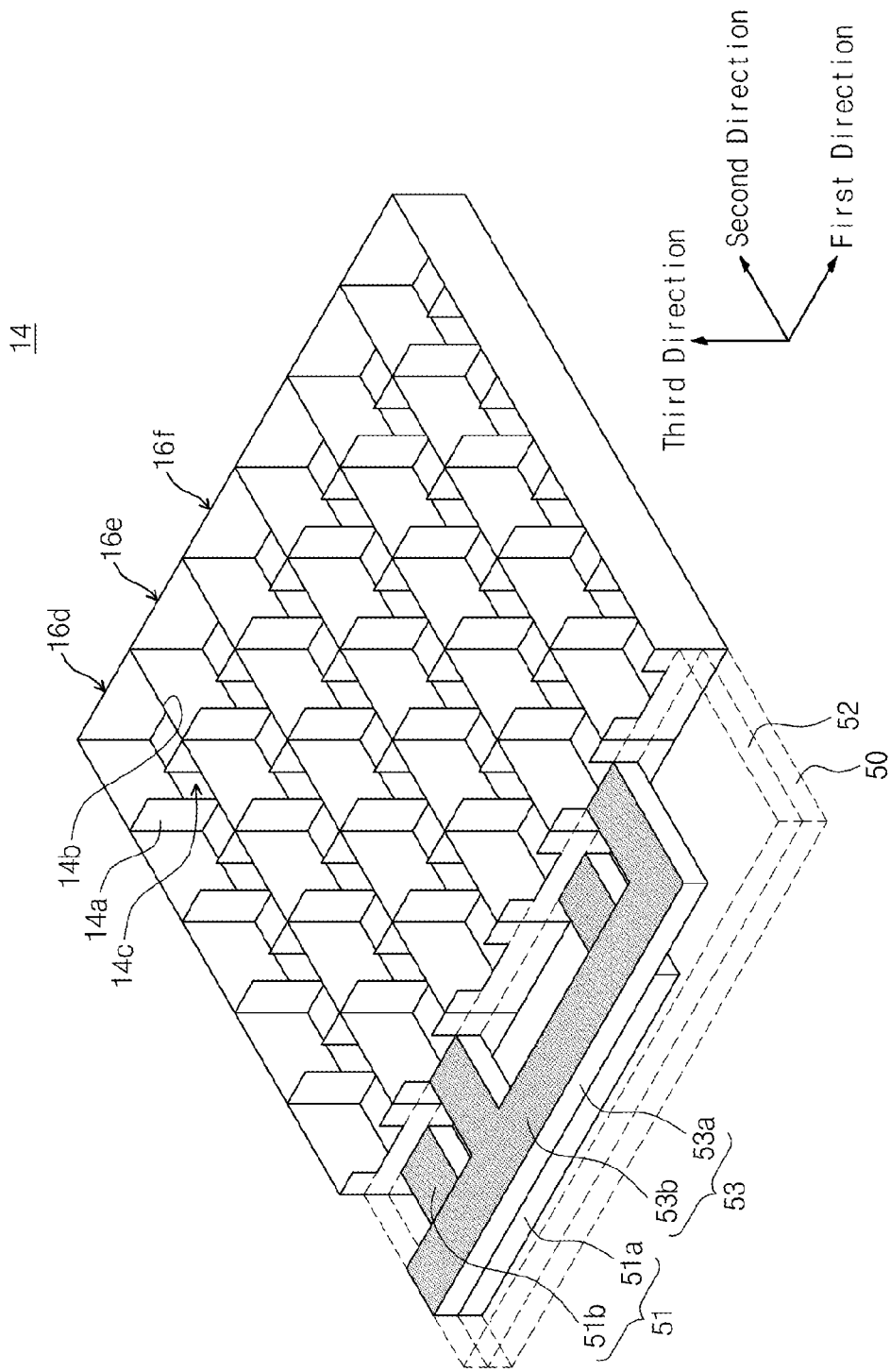
Figure 10C:
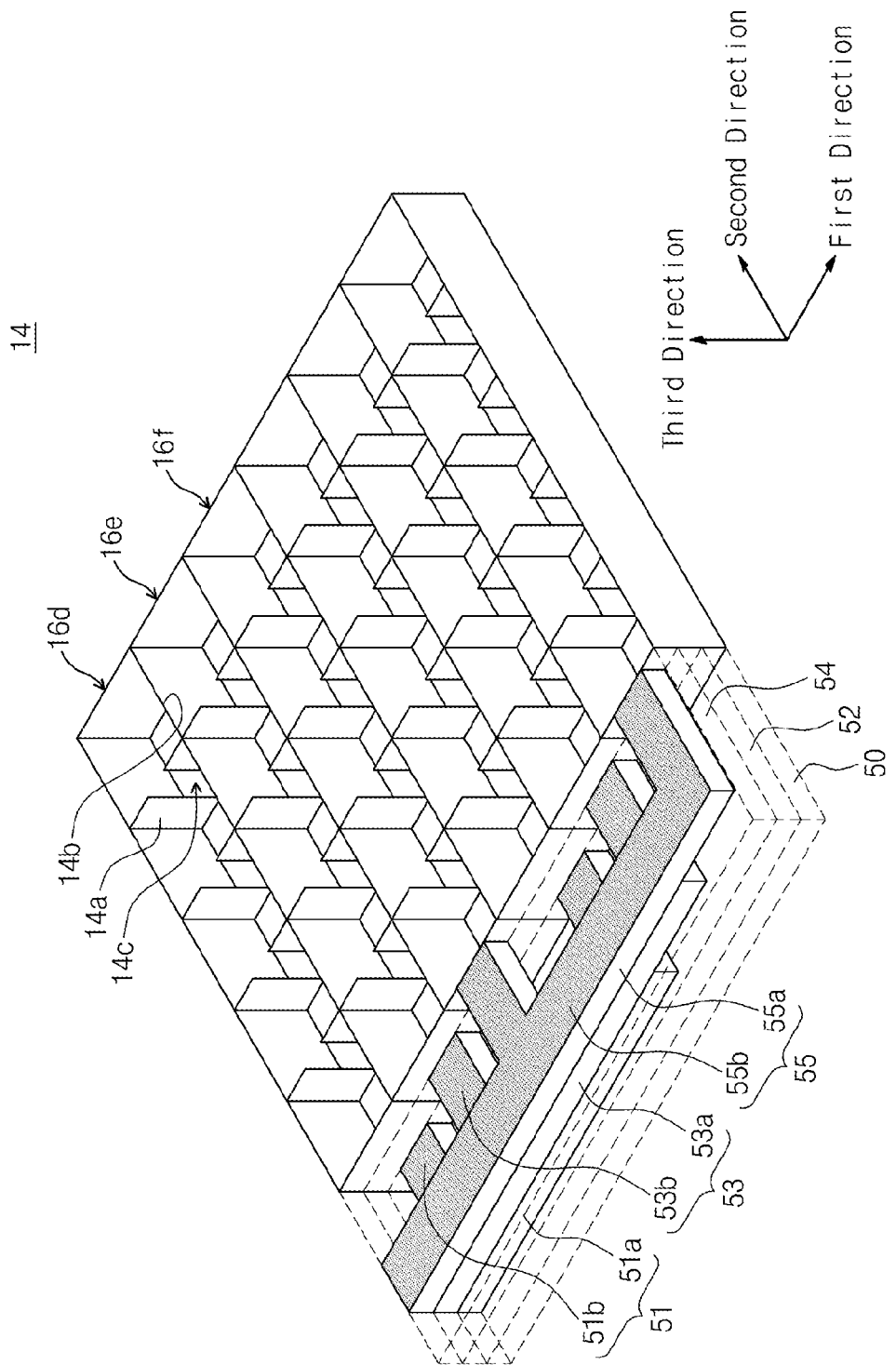

FIGS. 10A to 10C are perspective views illustrating a method of forming ink-injection tubes to a partition structure in a method of fabricating a display apparatus according to other embodiments of the inventive concept. In the present embodiment, the same elements as described in the aforementioned embodiments will be indicated by the same reference numerals or the same reference designators. For the purpose of ease and convenience in explanation, the descriptions to the same elements as in the above embodiments will be omitted or mentioned briefly.

Referring to FIG. 10A, a first layer 50 may be formed on one sidewall of the partition structure 14 and then a lithography process may be performed on the first layer 50 to form a first ink-injection pattern 51a. The first ink-injection pattern 51a may be formed to extend from the first cell region groups 16d including the first cell regions arranged in the second direction. Thus, the one sidewall of the partition structure 14 which is adjacent to the second and third cell regions 16e and 16f may be exposed by the first ink-injection pattern 51a. Additionally, a first ink-injection cover 51b may be formed on the first ink-injection pattern 51a. The first ink-injection pattern 51a and the first ink-injection cover 51b may constitute a first ink-injection tube 51.

Referring to FIG. 10B, a second layer 52 may be formed on the one sidewall of the partition structure 14 where the first ink-injection tube 51 is not formed. Next, a lithograph process may be performed on the second layer 52 to form a second ink-injection pattern 53a. The second ink-injection pattern 53a may be formed to extend from the second cell region groups 16e including the second cell regions arranged in the second direction. Thus, the one sidewall of the partition structure 14 which is adjacent to the third cell regions 16f may be exposed by the first and third ink-injection patterns 51a and 53a. A second ink-injection cover 53b may be formed on the second ink-injection pattern 53a. The second ink-injection pattern 53a and the second ink-injection cover 53b may constitute a second ink-injection tube 53.

Referring to FIG. 10C, a third layer 54 may be formed on the one sidewall of the partition structure 14 where the first and second ink-injection tubes 51 and 53 are not formed. Next, a lithograph process may be performed on the third layer 54 to form a third ink-injection pattern 55a. The third ink-injection pattern 55a may be formed to extend from the third cell region groups 16f including the third cell regions arranged in the second direction. A third ink-injection cover 55b may be formed on the third ink-injection pattern 55a. The third ink-injection pattern 55a and the third ink-injection cover 55b may constitute a third ink-injection tube 55.

The first, second, and third ink-injection tubes 51, 53, and 55 may be arranged on the one sidewall of the partition structure 14 in a third direction perpendicular to the first and second directions. The first, second, and third ink-injection tubes 51, 53, and 55 may be formed of dry film photoresist (DFR) layers. A first, second, and third ink-exhaust tubes (not shown) may be formed on another sidewall of the partition structure 14 by using the same method as the first to third ink-injection patterns 51a, 53a, and 55a.

According to embodiments of the inventive concept, the lower substrate including the partition structure is bonded to the upper electrode to form the display structure, and then the electronic inks may be injected into the cell regions. Thus, the properties (e.g., the reflexibility, the contrast ratio, the response speed, the driving voltage) of the electronic inks may be maximally exhibited to improve the reliability of the display apparatus.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A method of fabricating a display apparatus, the method comprising:

forming a lower electrode on a lower substrate;

forming a partition structure and an ink-injection tube connected to one end of the partition structure on the lower electrode, the partition structure including first partitions constituting rows parallel to a first direction, second partitions constituting columns parallel to a second direction, and cell regions defined by the first and second partitions, each of the first partitions including an opening, and the columns of the second partitions crossing the rows of the first partitions;

covering the partition structure with an upper electrode; and injecting an electronic ink through the ink-injection tube to fill the cell regions of the partition structure.

2. The method of claim 1, wherein the ink-injection tube extends from the first partition.

3. The method of claim 2, wherein the ink-injection tube includes a plurality of ink-injection tubes; and wherein the plurality of ink-injection tubes are symmetrical.

4. The method of claim 2, wherein the cell regions comprise: first cell regions arranged in the second direction to constitute a first cell region group; second cell regions arranged in the second direction to constitute a second cell region group; and third cell regions arranged in the second direction to constitute a third cell region group, and wherein the first, second, and third cell region groups are alternately and repeatedly arranged in the first direction.

5. The method of claim 4, further comprising:

forming an ink-exhaust tube extending from the first partition of another end of the partition structure, wherein the ink-exhaust tube is formed when the ink-injection tube is formed.

6. The method of claim 5, wherein the ink-injection tube includes a first tube and second tubes and the ink-exhaust tube includes a third tube and fourth tubes;

wherein the number of the ink-injection tube is equal to the number of a color of the electronic ink filling the cell region groups;

wherein the number of the ink-exhaust tube is also equal to the number of the color of the electronic ink filling the cell region groups;

wherein each of the second tubes and each of the fourth tubes are connected to one end and another end of each of the cell region groups, respectively;

wherein the first tube is connected to the second tubes of the cell region groups filled with the electronic inks having the same color; and wherein the third tube is connected to the fourth tubes of the cell region groups exhausting the electronic inks having the same color.

7. The method of claim 6, wherein the ink-injection tube includes a plurality of ink-injection tubes connected to the first to third cell region groups, respectively; and wherein injecting the electronic ink comprises: injecting the electronic inks having different colors from each other into the first to third cell region groups, respectively.

8. The method of claim 5, before injecting the electronic ink, further comprising:

preparing a pump and an ink-exhaust connection tube connected to the pump; and connecting the ink-exhaust connection tube to the ink-exhaust tube.

9. The method of claim 4, wherein the ink-injection tube extends on one sidewall of the partition structure in the first direction.

10. The method of claim 9, wherein forming the ink-injection tube comprises:

forming a photoresist layer on the one sidewall of the partition structure;

patterning the photoresist layer to form an ink-injection pattern extending from the first cell region group; and forming an ink-injection cover on the ink-injection pattern.

11. The method of claim 9, wherein the ink-injection tube includes a plurality of ink-injection tubes connected to the first to third cell region groups, respectively; and wherein the ink-injection tubes are arranged in a direction perpendicular to a top surface of the lower substrate.

12. The method of claim 1, wherein covering the partition structure with the upper electrode comprises:

forming the upper electrode on an upper substrate;

forming an adhesive on the upper electrode; and bonding the partition structure to the adhesive.

13. The method of claim 1, after injecting the electronic ink, further comprising:

remove the ink-injection tube from the partition structure by a cutting process; and forming an insulating material at a cut portion of the partition structure to prevent the electronic ink from escaping from the partition structure.

14. The method of claim 1, wherein the partition structure is formed to have a honeycomb structure including hexagonal shapes, a strip type structure, or a network structure including quadrilateral shapes.

15. The method of claim 1, before forming the partition structure, further comprising:

forming thin film transistors in the cell regions on the lower substrate, respectively, wherein a drain electrode of each of the thin film transistors extends onto the lower substrate; and wherein the drain electrode of the thin film transistor is the lower electrode.

16. The method of claim 1, wherein the partition structure and the ink-injection tube are formed of a photoresist material.

17. The method of claim 1, wherein the electronic ink is formed of a material of which a color is electrically changed; and wherein the material of the electronic ink includes a dielectric fluid including a dye, a dielectric fluid including a pigment, a dielectric fluid including a dye and a pigment, a dielectric fluid including two or more colored particles, a color-changeable fluid, or a photonic crystal colloid.

* * * * *